US012792116B2

(12) United States Patent
Germagian

(10) Patent No.: US 12,792,116 B2
(45) Date of Patent: Nov. 10, 2026

(54) POWER DISTRIBUTION UNITS, SYSTEMS, AND RELATED METHODS FOR CONTROLLING RELAY SWITCHES OF ELECTRICAL CORDS

(71) Applicant: Gateview Technologies, Inc., Harvard, MA (US)

(72) Inventor: Mark Germagian, Harvard, MA (US)

(73) Assignee: Gateview Technologies, Inc., Jacksonville, FL (US)

( * ) Notice: Subject to any disclaimer, the term of this patent is extended or adjusted under 35 U.S.C. 154(b) by 316 days.

(21) Appl. No.: 17/716,969

(22) Filed: Apr. 8, 2022

(65) Prior Publication Data

US 2022/0229481 A1 Jul. 21, 2022

Related U.S. Application Data

(63) Continuation-in-part of application No. 17/017,266, filed on Sep. 10, 2020, now Pat. No. 11,307,625.

(60) Provisional application No. 62/898,269, filed on Sep. 10, 2019.

(51) Int. Cl.

| | |
|---|---|
| ***G06F 1/26*** | (2006.01) |
| ***G06F 1/28*** | (2006.01) |
| ***H02J 13/13*** | (2026.01) |
| ***H02J 13/14*** | (2026.01) |

(52) U.S. Cl.

CPC ................ *G06F 1/266* (2013.01); *G06F 1/28* (2013.01); *H02J 13/1331* (2026.01); *H02J 13/14* (2026.01)

(58) Field of Classification Search

CPC ...... G06F 1/266; G06F 1/28; H02J 13/00002; H02J 13/00004; H02J 13/00022; H02J 4/00; H02J 13/00016; H02J 13/0005

USPC .......................................................... 713/300

See application file for complete search history.

(56) References Cited

U.S. PATENT DOCUMENTS

| | | | | |
|---|---|---|---|---|
| 7,786,371 | B1 | 8/2010 | Moates | |
| 7,964,989 | B1 | 6/2011 | Puschnigg | |
| 8,093,751 | B1 * | 1/2012 | Puschnigg | H01R 13/70 307/38 |
| 8,106,541 | B1 | 1/2012 | Sarullo | |
| 8,587,148 | B2 | 11/2013 | Garb et al. | |
| 10,765,950 | B1 * | 9/2020 | Clementi | H01R 13/6658 |
| 11,307,625 | B2 * | 4/2022 | Germagian | G06F 1/266 |
| 2002/0002593 | A1 | 1/2002 | Ewing | |
| 2003/0102717 | A1 | 6/2003 | Tarr | |
| 2005/0063116 | A1 * | 3/2005 | Rotheroe | G01R 19/2513 361/90 |
| 2006/0103504 | A1 * | 5/2006 | Vassallo | G06Q 10/06 340/5.92 |

(Continued)

*Primary Examiner* — Chun Cao

(74) *Attorney, Agent, or Firm* — Olive Law Group, PLLC

(57) ABSTRACT

Power distribution units, power distribution systems, and related methods for controlling relay switches of electrical cords are disclosed herein. According to an aspect, an electronic device includes a power input for receipt of electrical power. Further, the electronic device includes a communications module configured to individually route signals to switching relays of a plurality of electrical cords for individually controlling transmission of power via the electrical cords. The communications module is also configured to individually route control signals to power monitoring circuits of the electrical cords for individually monitoring power levels of the electrical cords.

17 Claims, 8 Drawing Sheets

(56) References Cited

U.S. PATENT DOCUMENTS

| | | | | |
|---|---|---|---|---|
| 2008/0019067 | A1* | 1/2008 | Reynolds | G06F 1/266 361/93.1 |
| 2008/0062003 | A1 | 3/2008 | Paetz | |
| 2008/0309164 | A1* | 12/2008 | Lim | H01R 13/7038 307/115 |
| 2009/0295327 | A1 | 12/2009 | McGinley et al. | |
| 2009/0322160 | A1 | 12/2009 | DuBose et al. | |
| 2010/0019575 | A1 | 1/2010 | Verges | |
| 2010/0044195 | A1* | 2/2010 | Chiang | G06F 1/266 200/175 |
| 2010/0084921 | A1* | 4/2010 | Martins | H01R 27/00 307/72 |
| 2010/0096925 | A1 | 4/2010 | Lee | |
| 2011/0087904 | A1 | 4/2011 | Lee | |
| 2011/0144824 | A1 | 6/2011 | Campesi et al. | |
| 2011/0175711 | A1* | 7/2011 | Kuo | G06F 1/266 340/12.32 |
| 2017/0149180 | A1 | 5/2017 | Siegler | |
| 2017/0354053 | A1* | 12/2017 | Irons | H01R 25/165 |
| 2019/0179395 | A1* | 6/2019 | Adderly | G06F 1/3206 |

* cited by examiner

POWER DISTRIBUTION UNITS, SYSTEMS, AND RELATED METHODS FOR CONTROLLING RELAY SWITCHES OF ELECTRICAL CORDS

CROSS REFERENCE TO RELATED APPLICATIONS

This is a continuation-in-part application of U.S. Non-Provisional patent application Ser. No. 17/017,266, filed Sep. 10, 2020, and titled POWER DISTRIBUTION UNITS, SYSTEMS, AND RELATED METHODS FOR CONTROLLING RELAY SWITCHES OF ELECTRICAL CORDS, which claims priority to U.S. Patent Application No. 62/898,269, filed Sep. 10, 2019, and titled SWITCHING CORDS FOR A DEVICE THAT DISTRIBUTES POWER; the contents of which are incorporated herein by reference in their entireties.

TECHNICAL FIELD

The presently disclosed subject matter relates generally to power distribution. Particularly, the presently disclosed subject matter relates to power distribution units, power distribution systems, and methods for controlling relay switches of electrical cords.

BACKGROUND

A power distribution unit (PDU) is an assembly of electrical plug outlets or electrical plug receptacles that receive electrical power from a source and distribute electrical power to one or more separate electronic devices. An electronic device is electrically connected to an electrical plug receptacle via an electrical cord having an electrical plug that interfaces with the electrical plug receptacle. The PDU assembly receives power input from a power source and distributes this power to each receptacle where a plug is inserted.

PDUs are used in a variety of settings such as electronic equipment racks. For example, a server rack may include multiple servers that are connected by respective electrical cords to a PDU. The PDU may supply power to the servers via conductive pathways provided by the electrical cords.

Rack PDUs often include switching relays that are used to control power to connected electronic devices. These switching relays are integrated into the PDU and can involve highs costs when a switching relay fails. Particularly, upon failure, the switching relay must be removed and replaced, and the PDU must be reconfigured for the replacement PDU. Also, the PDU must provide valuable space to accommodate all of its switching relays. In view of these difficulties, there is a need for improved PDUs and related systems.

Further, there are many standard PDUs that are installed without the capability of monitoring power levels of electrical cords connected thereto. Such standard PDUs lack the ability to be remotely controlled for turning on or off one of its outlets. The enabling of standard PDUs to provide such features would be beneficial in many applications. Therefore, a need exists to provide systems and techniques for providing these features.

BRIEF DESCRIPTION OF THE DRAWINGS

Figure 1:
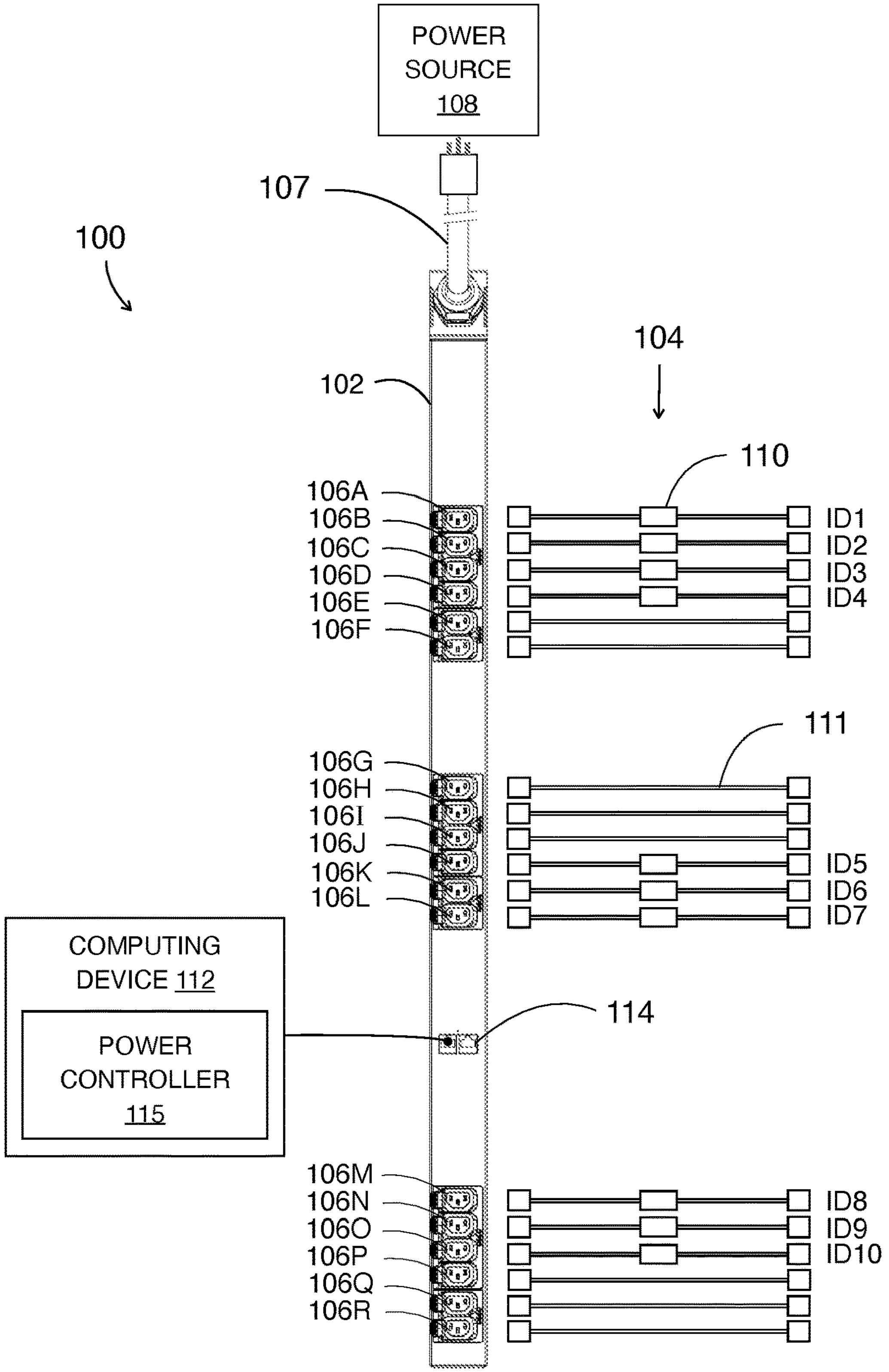
Figure 2:
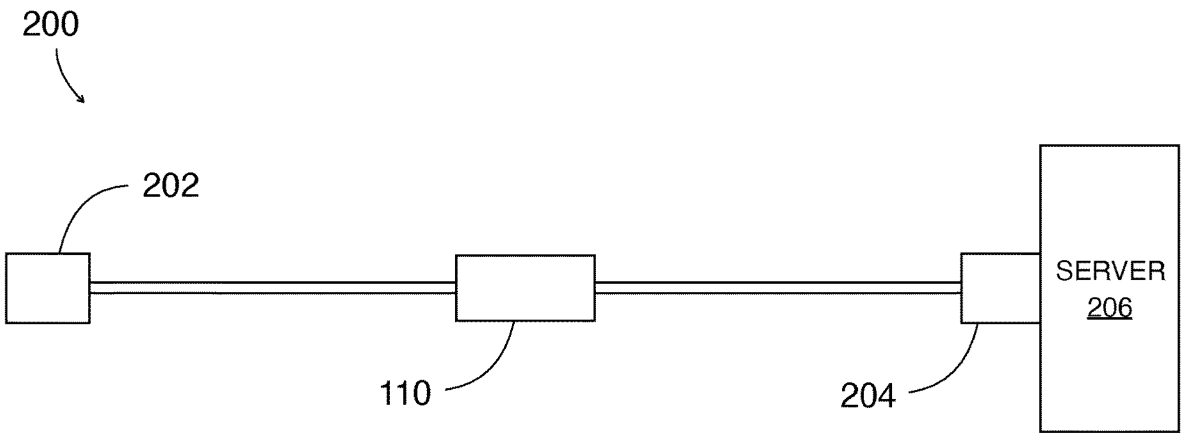
Figure 3:
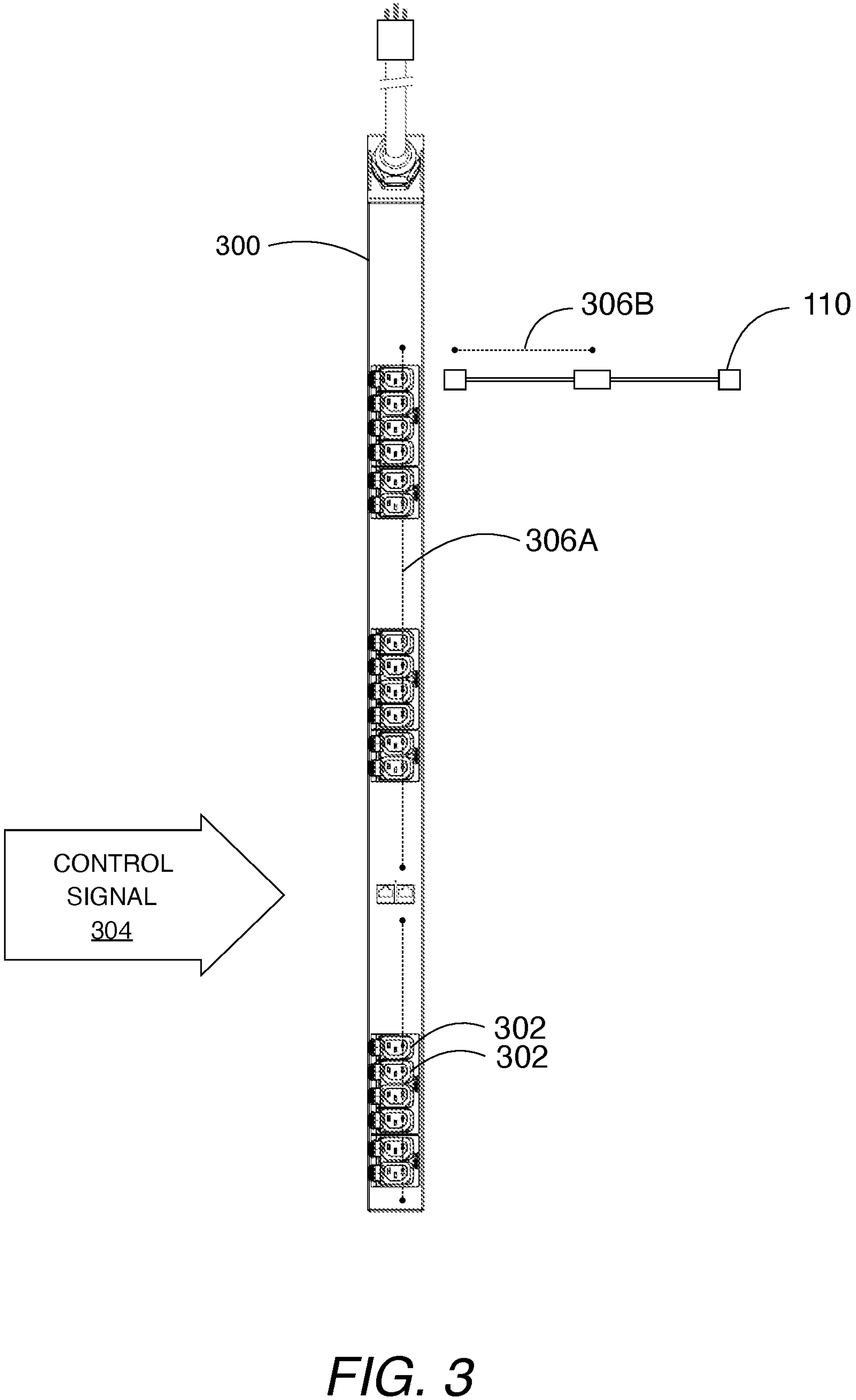
Figure 4:
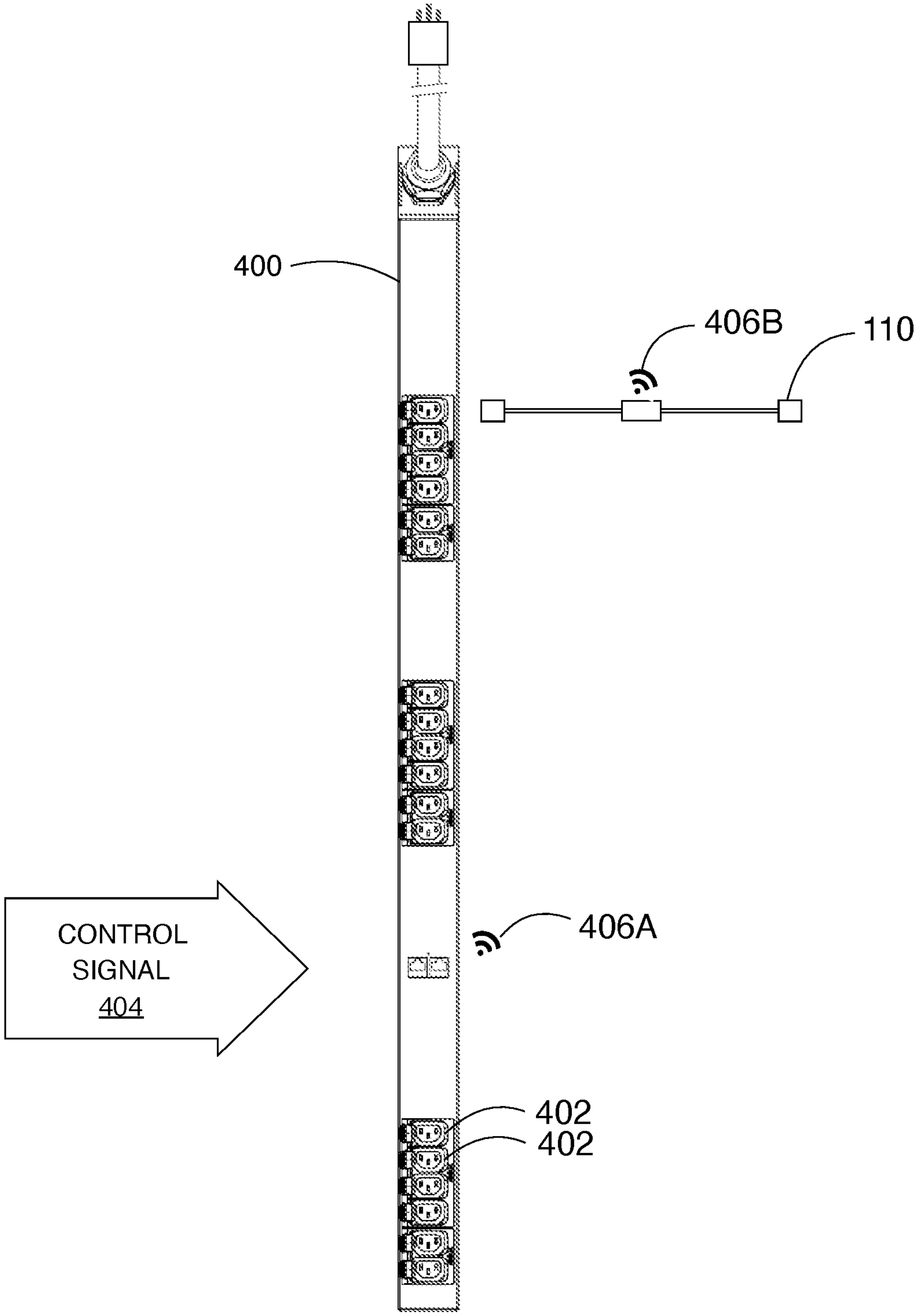
Figure 5:
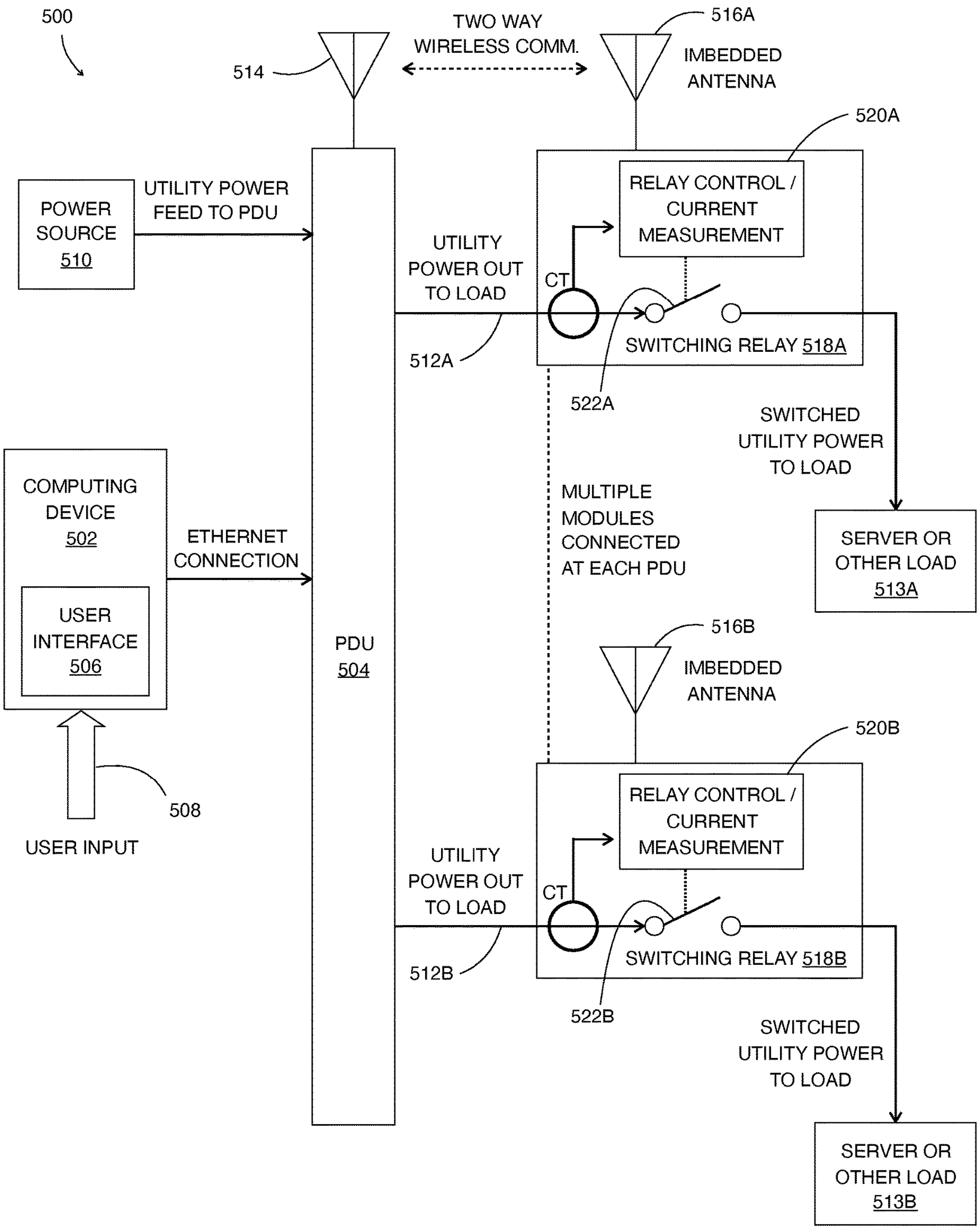
Figure 6:
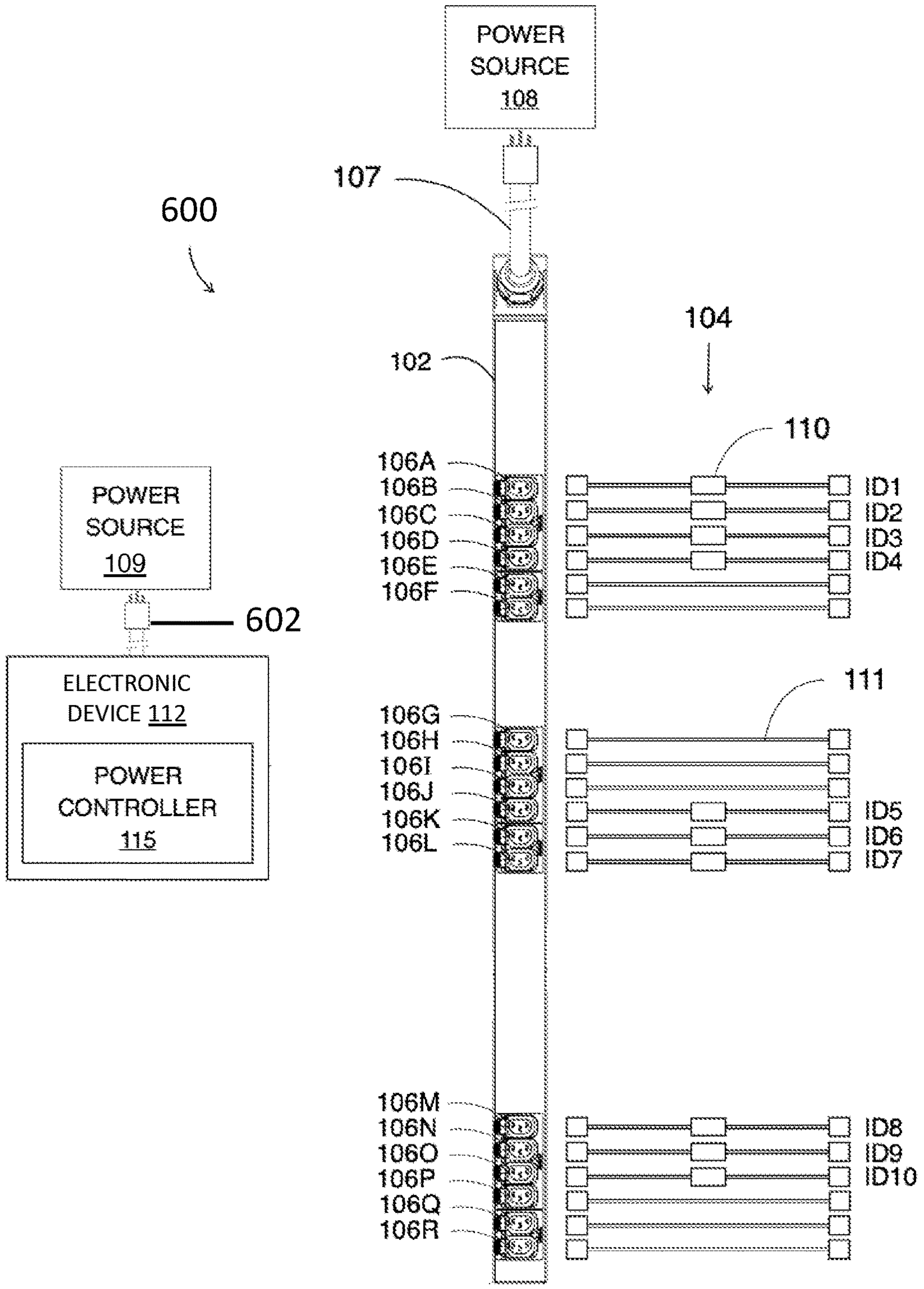
Figure 7:
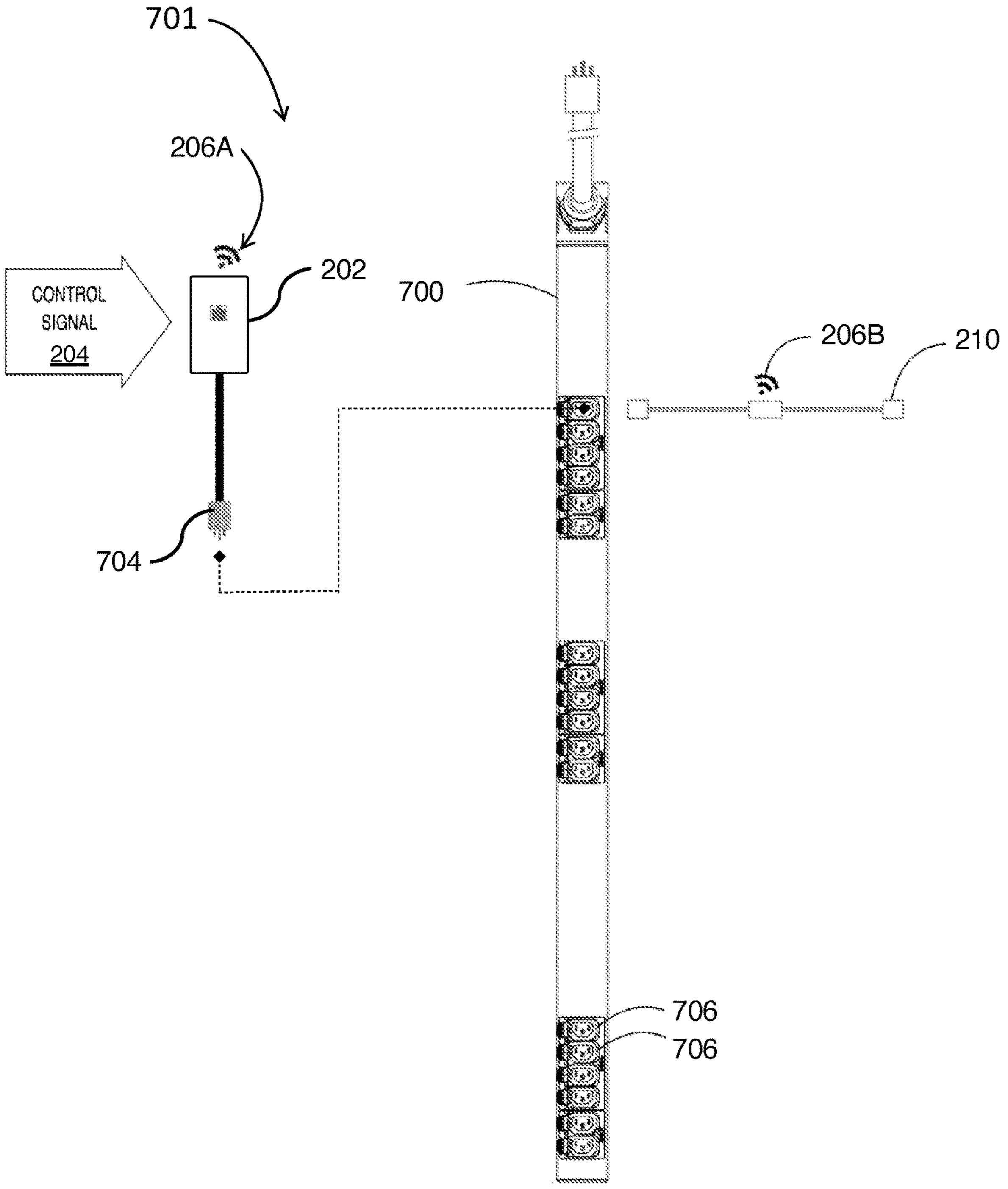
Figure 8:
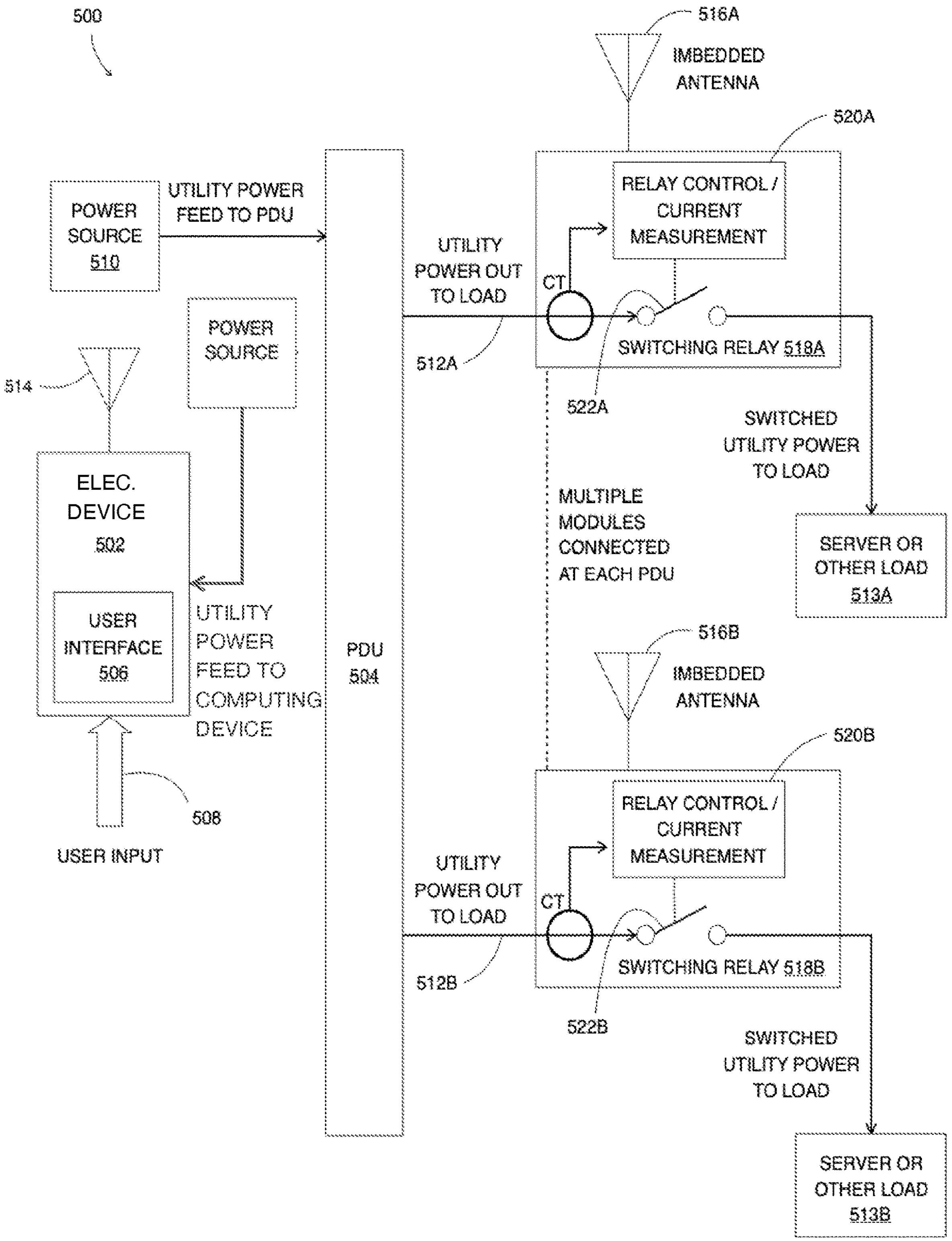

Having thus described the presently disclosed subject matter in general terms, reference will now be made to the accompanying Drawings, which are not necessarily drawn to scale, and wherein:

FIG. 1 is a layout diagram of a PDU system in accordance with embodiments of the present disclosure;

FIG. 2 illustrates a top view of an electrical cord in accordance with embodiments of the present disclosure;

FIG. 3 illustrates a top view of an example PDU including multiple electrical receptacles for plug-in of electrical cords in accordance with embodiments of the present disclosure;

FIG. 4 illustrates a top view of another example PDU including multiple electrical receptacles for plug-in of electrical cords in accordance with embodiments of the present disclosure;

FIG. 5 illustrates a diagram of another example PDU system 500 and its flow for controlling transmission of power via electrical cords in accordance with embodiments of the present disclosure;

FIG. 6 illustrates a layout diagram of a PDU system in accordance with embodiments of the present disclosure;

FIG. 7 illustrates a top view of a layout diagram of a PDU system including a standard PDU, an electrical cord having a switching relay and wireless communications module, and a remote electronic device in accordance with embodiments of the present disclosure; and FIG. 8 illustrates a diagram of another example PDU system and its flow for controlling transmission of power via electrical cords in accordance with embodiments of the present disclosure.

SUMMARY

The presently disclosed subject matter relates to PDUs, power distribution systems, and related methods for controlling relay switches of electrical cords. Power distribution units, power distribution systems, and related methods for controlling relay switches of electrical cords are disclosed herein. According to an aspect, an electronic device includes a power input for receipt of electrical power. Further, the electronic device includes a communications module configured to individually route signals to switching relays of a plurality of electrical cords for individually controlling transmission of power via the electrical cords. The communications module is also configured to individually route control signals to power monitoring circuits of the electrical cords for individually monitoring power levels of the electrical cords.

According to another aspect, a power distribution system includes electrical cords each including a switching relay configured to control transmission of power via the respective electrical cord. The system also includes an electronic device comprising a communications module. The communications module is configured to individually route signals to switching relays of the electrical cords for individually controlling transmission of power via the electrical cords. Also, the communications device is configured to individually route control signals to power monitoring circuits of the electrical cords for individually monitoring power levels of the electrical cords.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, “an element” means at least one element and can include more than one element.

“About” is used to provide flexibility to a numerical endpoint by providing that a given value may be “slightly above” or “slightly below” the endpoint without affecting the desired result.

The use herein of the terms “including,” “comprising,” or “having,” and variations thereof is meant to encompass the elements listed thereafter and equivalents thereof as well as additional elements. Embodiments recited as “including,” “comprising,” or “having” certain elements are also contemplated as “consisting essentially of” and “consisting” of those certain elements.

Unless otherwise defined, all technical terms used herein have the same meaning as commonly understood by one of ordinary skill in the art to which this disclosure belongs.

In embodiments, a switching power cord designed and configured to control power to an electronic device may include a power cord, a power plug, which can unplug from an electrical receptacle positioned on a power distribution unit by means of a mechanical action.

FIG. 1 illustrates a layout diagram of a PDU system 100 in accordance with embodiments of the present disclosure. Referring to FIG. 1, the system 100 includes a PDU 102 having multiple electrical plug receptacles 106A-106R. Although 18 receptacles are shown in this example, it should be understood that the PDU 102 may include any other suitable number of receptacles that are operable in accordance with embodiments of the present disclosure. Also, it is noted that the PDU 102 is operable to provide electrical power electronic devices (not shown) that are plugged into the receptacles 106A-106R. In an example, electronic devices may be operatively connected to respective ends of electrical cords (generally designated 104), and the opposing ends of the electrical cords 104 may be connected to the receptacles 106A-106R such that power is supplied to the electronic devices as will be understood by those of skill in the art. The electrical cords 104 can each provide a conductive path between its ends for transmission of power. In this figure, the electrical cords 104 are shown as being disconnected from the receptacles 106A-106R.

The PDU 102 include an electrical cord 107 (or any other suitable connector for connecting to a power source) configured to connect to a power source 108 for receipt of power. For example, the power source 108 may be a suitable power source for supplying power to servers held in a rack. Alternatively, the power may be supplied to any other electronic devices or computing devices.

In accordance with embodiments, some of the electrical cords 104 may each include a switching relay 110 configured to control transmission of power via the respective electrical cord. Other electrical cords 111 in this example do not have a switching relay and, as such, cannot selectively control power to their respective electronic devices when operatively connected to the PDU 102. The electrical cords 104 each include a switching relay 110 configured to receive a control signal for controlling the transmission of power between its ends. In response to receipt of a control signal, the recipient switching relay 110 can controllably open or close its conductive path between its ends to thereby control the supply of power to its electronic device when connected to the PDU 102.

In accordance with embodiments, the switching relays 110 are configured to be individually addressable by a unique identifier for communication of a control signal. For example, the switching relays 110 have identifiers ID1-ID10. Thus, each switching relay 110 has a unique identifier such that a control signal can be communicated specifically to it. In another example, two or more switching relays can share the same identifier such that can be addressed by the same control signal.

A computing device 112 may be communicatively connected to the PDU 102 via a data port 114 for communicating control signals to the switching relays 110 via the PDU 102. Particularly, the computing device 112 may include a power controller 115 that can generate and communicate the control signals that are addressed to specific switching relays 110 for opening and closing pathways of the electrical cords for providing power. The PDU 102 may include a communication module with suitable hardware for receiving the control signals input into the data port 114 and for sending the control signals to the switching relays via a wired connection. For example, the communication may be over a power wire of the PDU 102. It is noted that the power controller 115 may be implemented by suitable hardware, software, and/or firmware (e.g., one or more processors and memory with executable code for implementing the functionality described for the power controller 115).

The data communication of the system 100 can enable communication with local or global networks systems as per the user's requirements. The uniquely designated switching relay cord identifications can provide a user with the ability to control the circuit remotely.

FIG. 2 illustrates a top view of an electrical cord 200 in accordance with embodiments of the present disclosure. Referring to FIG. 2, the electrical cord 200 including a switching relay 110 positioned between ends 202 and 204 of the electrical cord 200. End 202 includes an electrical plug configured to operatively interface with an electrical receptacle such as one of the electrical receptacles 106A-106R shown in FIG. 1. The opposing end 204 is shown as being operatively plugged into a server 206, but the end 204 may alternatively be plugged into any other suitable electrical device. The switching relay 110 may receive a control signal as described herein that is addressed to the unique identifier of the switching relay 110 for controlling the transmission of power from end 202 to end 204, and thereby to the server 206. Particularly, the control signal can instruct the switching relay 110 to either open or close the conductive path between the ends 202 and 204.

With regarding to FIG. 2, it is noted that the cord can have any suitable length necessary for the user to provide connection from the PDU to the electronic equipment that require power. The plug type can be a C13 or a C19, alternatively other plug types can be considered to allow equipment in the rack to be connected to the rack PDU. The cord 200 has plugs located at the two terminus points at the ends of the cord. It is noted that the control signal can be a close signal or an open signal. The user's computing device may remotely open or close the circuit by sending an open or close command signal. In embodiments, the user may control the power to a specific cord or to a number of cords at the user's discretion. The user may control the power flow to the cord as a means to reboot the server or meet other requirements.

FIG. 3 illustrates a top view of an example PDU 300 including multiple electrical receptacles 302 for plug-in of electrical cords in accordance with embodiments of the present disclosure. Referring to FIG. 3, a control signal 304 may be communicated to the PDU 300 over a suitable data communications system. The control signal 304 may include instructions for switching. The PDU 300 is configured to send and to receive instructions for enabling or disabling power transmission via cords as described herein. The instructions may be sent over one common power bus 306 of the PDU 300 between a user's computing device and the switching relays of the electrical cords.

FIG. 4 illustrates a top view of an example PDU 400 including multiple electrical receptacles for plug-in of electrical cords in accordance with embodiments of the present disclosure. Referring to FIG. 4, the PDU 400 is similar to the PDU 300 shown in FIG. 3 except that communication from the PDU 400 to the switching relays is via wireless communication. For example, the PDU may include a wireless communication module configured to wirelessly communication instruction messages to one or more switching relays for enabling or disabling power transmission via cords in accordance with embodiments of the present disclosure. For example, FIG. 4 shows a wireless communication signal 406A carrying an instruction from the PDU 400 to the switching relay 110, where the signal 406B is received. Further, in this example, the control signal 404 may be generated at another source and communicated to the PDU 400, where it is routed to the switching relay 110.

FIG. 5 illustrates a diagram of another example PDU system and its flow for controlling transmission of power via electrical cords in accordance with embodiments of the present disclosure. Referring to FIG. 5, the system 500 includes a computing device 502 (e.g, a laptop computer, a desktop computer, smartphone, etc.) and a PDU 504 that are communicatively connected. For example, the computing device 502 may be connected to the PDU 504 via a wired connection (e.g., Ethernet connection) or a wireless connection. The computing device 502 may include a user interface 506 configured to present information and graphics to a user, and to receive user input 508. The user input 508 may include instructions for controlling transmission of power via electrical cords connected to the PDU 504.

The PDU 504 may be connected to a power source 510 (e.g., an electrical outlet) as will be understood by those of skill in the art. Further, the PDU 502 may distribute this power to connected electrical cords 512A and 512B, which may be connected to electronic devices 513A and 513B (e.g., servers) for receipt of power. The PDU 504 may include an antenna 514 that is configured to communicatively connect to antennas 516A and 516B of electrical cords 512A and 512B, respectively. The antennas 516A and 516B may be embedded within switching relays 518A and 518B, respectively, for receipt of instructions for opening or closing the conductive paths of the respective electrical cords. Specifically, instructions via user input 508 may be received for opening or closing the conductive paths of the electrical cords 512A and 512B. The instructions may include an identifier for the cord. Subsequently, the PDU may receive the instructions from the computing device 502, suitably process the instructions, and route instruction(s) to identified cords based on the identifier(s). The instructions may be sent via the two-way wireless communication between antennas 514 and/or 516A, 516B. A recipient antenna 516A or 516B may provide the instruction to respective relay control current measurement electronics 520A or 520B. The electronics 520A or 520B may open or close a respective switch 522A or 522B to open or close the pathway of the cord based on the instruction.

With continuing reference to FIG. 5, the electronics 520A and 520B may be configured to measure current transmitted via the pathways of the electrical cords 512A and 512B, respectively. Based on the measurement, the electronics 520A and 520B may determine whether there is a pathway via their respective cords. Further, the electronics 520A and 520B may communicate data to the PDU via the antennas to indicate whether there is a conductive pathway. The PDU 504 may communicate this information to the computing device 502 where the user interface 506 may present (e.g., graphically) to indicate whether there is a conductive pathway on identified cords.

In accordance with embodiments, a switching relay is disclosed to control power flow through the switching power cord and its connected electronic device. The switching cord can include a conductive cord having plug ends that connect with a PDU at one end and an electronic device at the opposite end. The present disclosure provides a method of placing a switching relay in one or more identifiable cord or cords. The cord can be configured with a switching relay provides a means of communicating and controlling the power in a specific identified cord. Further, by configuring the switching relay into the cord design the switching relay can utilize wireless communication or the existing power bus for communication avoiding the need for additional communication cables. This has the advantage of directly translating to significant advantages and benefits through lower installation costs as well as the associated costs with repairing, removal retrofitting in service PDUs.

Another example cost benefit is for a server rack user and that a rack PDU may be much smaller since the PDUs and systems disclosed herein provide a more efficient means of providing the same function while decreasing costs and increasing efficiency because the switching relays are more now more accessible and easier to change if the need arises. As pointed out above, the space in the back of the rack is at a premium and when the need to access rack mounted electronic devices with the current methods this procedure is oftentimes difficult time consuming and cumbersome.

Another advantage of the present disclosure can alleviate significant up-front costs while providing easily accessible options where the user only needs to add switching relays to receptacles when and where they are required.

Another advantage of the present disclosure is the now lowered costs of repairing a PDU. Switching is often accomplished through mechanical relays that are prone to failure. In the case where a relay in a PDU fails, the entire PDU must be removed to be serviced or the PDU may need to be replaced altogether. As introduced and described, the present disclosure avoids the aforementioned challenges by configuring the cord itself with the switching relay and if the switching relay fails in this scenario only the cord need be replaced. Related to this advantage is that each switching relay cord possesses its own assigned identification designation, so there are no limits to the number of switching relay cords that can be offered.

The introduction of an electrical power cord that possesses the ability to remotely control power through the power distribution unit dramatically creates immediate opportunities and advantages into the IT power distribution industry. The innovative concept of introducing a configured power cord with a switching relay provides a means of communicating and controlling power to the connected electronic device, which translates to significant advantages for device reliability as well as realized lower maintenance and PDU replacement cost had the switching relay been configured within the PDU itself.

FIG. 6 illustrates a layout diagram of a PDU system 600 in accordance with embodiments of the present disclosure. Referring to FIG. 6, the system 600 is similar to the system 100 shown in FIG. 1 except that the electronic device 112 is separate from the PDU 102. Particularly, there is no direct physical connection between the electronic device 112 and the PDU 102. System 600, in this example, does not include a signal connection from the electronic device 112 to the PDU 102 as shown in FIG. 1. Rather, the electronic device 112 can wirelessly communicate with the switching relays 110. The electronic device 112 can be power by connection of its electrical cord 602 or other power input to a power source 109 for receipt of electrical power.

The electronic device 112 can also include a wireless communications module (not shown) configured to individually route signals to switching relays 110 of the electrical cords for individually controlling transmission of power via the electrical cords. Each switching relay 110 can also include a wireless communications module (not shown) for wirelessly communicating with the electronic device 112. Further, the communications module of the electronic device 112 can individually route control signals to power monitoring circuits of the electrical cords for individually monitoring power levels of the electrical cords. The communication module can wirelessly communicate signals to multiple electrical cords for the purpose of switching power or monitoring power levels. System 600 allows control of switching relays and power monitoring of circuits for PDU 102, which may be a standard PDU without communication capability or with communication capability without the functions of switching power or monitoring power levels of the electrical cords connected thereto. Each electrical cord can have a unique identifier which allows the electronic device 112 to selectively communicate with any particular one of the electrical cords for individually controlling or monitoring power.

FIG. 7 illustrates a top view of a layout diagram of a PDU system 701 including a standard PDU 700, an electrical cord 210 having a switching relay and wireless communications module, and a remote electronic device 202 in accordance with embodiments of the present disclosure. Referring to FIG. 7, the system is similar to the system shown in FIG. 3 except that the system has a control signal 204 that can be communicated to the electronic device 202. For example, the control signal 204 may be communicated from another electronic device and received by a communications module of the electronic device 202. The control signal 204 can include, for example, instruction for switching power of an electrical cord connected to PDU 700, a request for monitoring power levels of an electrical cord connected to PDU 700, or the like. Subsequent to receiving the control signal 204, the electronic device 202 can generate a control signal 206A with the same or similar instructions as the control signal 204. The control signal 206A may be wireless and received by the electrical cord 210. The electrical cord 210 can include a wireless communications module configured to receive the control signal 206A and implement the instruction(s). For example, the control signal 206A may include an instruction to turn on or turn off power, and a switching relay of the electrical cord 210 can be controlled to turn on or off the power based on the instruction. In another example, the control signal 206A can include a request for power monitoring, and the electrical cord 210 can respond with an indication of its power level in response to receipt of the request. Continuing this example, the electrical cord 210 can communicate a wireless signal 206B that includes the power level information or any other reporting status information.

Within continuing reference to FIG. 7, the electronic device 202 can be electrically powered in any suitable manner. In this example, the electronic device 202 includes an electrical cord 704 for plugging into an outlet 706 of the PDU 700 for receipt of electrical power.

FIG. 8 illustrates a diagram of another example PDU system and its flow for controlling transmission of power via electrical cords in accordance with embodiments of the present disclosure. Referring to FIG. 8, the electrical cord 700 is similar to the electrical cord 512A shown in FIG. 5 except that the electronic device 112 of FIG. 8 used to control and monitor power is separate from the PDU 504. The electronic device 502 utilizes user input as does system 500 in FIG. 5; however, this input does not pass through PDU 504. The electronic device 502 has its own power source since it is not powered by PDU 504. The electronic module communicates directly to the switching cord through the embedded antenna of the electronic device 514 to the embedded antenna of the electrical cord 516A.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. An electronic device comprising:

a power input and power cord for receipt of electrical power from a power distribution unit, wherein the power distribution unit includes a plurality of passive electrical receptacles; and a communications module configured to:

wirelessly receive control signals from another device that include instructions for switching power of a plurality of electrical cords connected to the power distribution unit, and wherein the control signals include requests for monitoring power levels of the plurality of electrical cords, wherein each of the plurality of electrical cords comprises (i) a first end configured to operatively interface with a respective one of the passive electrical receptacles, (ii) a second end configured to operative interface with a corresponding electronic device, (iii) a switching relay disposed in-line between the first and second ends and configured to controllably open or close a conductive path between the first and second ends, (iv) a power monitoring circuit disposed in-line with the conductive path and configured to measure an electrical parameter indicative of a power level of the respective electrical cord, and (v) a wireless communications module and an identifier uniquely associated with the respective electrical cord;

generate control signals for communication to electronic modules of the plurality of electrical cords in response to receipt of the control signals for switching power of a plurality of electrical cords and requests for monitoring power levels of the plurality of electrical cords in accordance with the received control signals;

wirelessly and individually route the generated control signals as wireless messages each including the identifier of a target one of the plurality of electrical cords such that only the electronic module of the target electrical cord, based on its identifier, controls its switching relay to individually control transmission of power via the target electrical cord;

wirelessly and individually route the generated control signals, including the identifier of the target electrical cord, to power monitoring circuits of the plurality of electrical cords for individually causing the power monitoring circuits to monitor power levels of the respective electrical cords; and receive, from the electronic modules of the plurality of electrical cords, data representing the monitored power levels of the respective electrical cords; and communicate, to the other device, the monitored power levels of the electrical cords.

2. The electronic device of claim 1, wherein the electrical cords are configured to be individually addressable by the communication module by a unique identifier for communication of a control signal.

3. The electronic device of claim 1, wherein the communications module is configured to receive the control signals from another electronic device.

4. The electronic device of claim 1, wherein two or more of the switching relays are configured to be addressable by a single identifier for communication of a control signal.

5. The electronic device of claim 1, wherein the communications module is configured to wirelessly send to an electrical cord a control signal comprising a unique identifier and an instruction to enable or disable power transmission via a respective switching relay that is addressable by the unique identifier.

6. The electronic device of claim 1, wherein the communication module to wirelessly communicate the control signals to the electronic cords.

7. The electronic device of claim 1, wherein each electrical cord comprises an input module for receipt of wireless commands for controlling transmission of power via the electrical cord, wherein each electronic module comprises a switching relay, and wherein the input module is configured to:

receive the wireless commands; and communicate the control signals to the switching relays based on the received commands.

8. The electronic device of claim 7, wherein the input module of each electrical cord is configured to indicate monitored power level.

9. A power distribution system comprising:

a plurality of electrical cords each including an electronic module comprising a switching relay configured to control transmission of power via the respective electrical cord, and wherein the electronic module is configured to monitor a power level of the respective electrical cord; and an electronic device comprising:

a power input and a power cord for receipt of electrical power from a power distribution unit, wherein the power distribution unit includes a plurality of passive electrical receptacles; and a communications module configured to:

wirelessly receive control signals from another device that include instructions for switching power of the plurality of electrical cords connected to the power distribution unit, and wherein the control signals include requests for monitoring power levels of the plurality of electrical cords, wherein each of the plurality of electrical cords comprises (i) a first end configured to operatively interface with a respective one of the passive electrical receptacles, (ii) a second end configured to operative interface with a corresponding electronic device, (iii) a switching relay disposed in-line between the first and second ends and configured to controllably open or close a conductive path between the first and second ends, (iv) a power monitoring circuit disposed in-line with the conductive path and configured to measure an electrical parameter indicative of a power level of the respective electrical cord, and (v) a wireless communications module and an identifier uniquely associated with the respective electrical cord;

generate control signals for communication to electronic modules of the plurality of electrical cords in response to receipt of the control signals for switching power of a plurality of electrical cords and requests for monitoring power levels of the plurality of electrical cords in accordance with the received control signals;

wirelessly and individually route the generated control signals as wireless messages each including the identifier of a target one of the plurality of electrical cords such that only the electronic module of the target electrical cord, based on its identifier, controls its switching relay to individually control transmission of power via the target electrical cord;

wirelessly and individually route the generated control signals, including the identifier of the target electrical cord, to power monitoring circuits of the plurality of electrical cords for individually causing the power monitoring circuits to monitor power levels of the respective electrical cords; and receive, from the electronic modules of the plurality of electrical cords, data representing the monitored power levels of the respective electrical cords; and communicate, to the other device, the monitored power levels of the electrical cords.

10. The power distribution system of claim 9, wherein the electronic modules each comprise a switching relay configured to be individually addressable by the communication module by a unique identifier for communication of a control signal.

11. The power distribution system of claim 9, wherein the communications module is configured to receive the control signals from another electronic device.

12. The power distribution system of claim 9, wherein two or more of the switching relays are configured to be addressable by a single identifier for communication of a control signal.

13. The power distribution system of claim 9, wherein the communications module is configured to wirelessly send to an electrical cord a control signal comprising a unique identifier and an instruction to enable or disable power transmission via a respective switching relay that is addressable by the unique identifier.

14. The power distribution system of claim 9, wherein the communication module is configured to wirelessly communicate the control signals to the electronic cords.

15. The power distribution system of claim 9, wherein each electrical cord comprises an input module for receipt of wireless commands for controlling transmission of power via the electrical cord, wherein each electronic module comprises a switching relay, and wherein the input module is configured to:

receive the wireless commands; and communicate the control signals to the switching relays based on the received commands.

16. The power distribution system of claim 15, wherein the input module of each electrical cord is configured to indicate monitored power level.

17. A method comprising:

providing a power input and power cord for receipt of electrical power from a power distribution unit, wherein the power distribution unit includes a plurality of passive electrical receptacles; and at an electronic device comprising a wireless communications module:

wirelessly receiving control signals from another device that include instructions for switching power of a plurality of electrical cords connected to the power distribution unit, and wherein the control signals include requests for monitoring power levels of the plurality of electrical cords, wherein each of the plurality of electrical cords comprises (i) a first end configured to operatively interface with a respective one of the passive electrical receptacles, (ii) a second end configured to operative interface with a corresponding electronic device, (iii) a switching relay disposed in-line between the first and second ends and configured to controllably open or close a conductive path between the first and second ends, (iv) a power monitoring circuit disposed in-line with the conductive path and configured to measure an electrical parameter indicative of a power level of the respective electrical cord, and (v) a wireless communications module and an identifier uniquely associated with the respective electrical cord;

generating control signals for communication to electronic modules of the plurality of electrical cords in response to receipt of the control signals for switching power of a plurality of electrical cords and requests for monitoring power levels of the plurality of electrical cords in accordance with the received control signals;

wirelessly and individually routing the generated control signals as wireless messages each including the identifier of a target one of the plurality of electrical cords such that only the electronic module of the target electrical cord, based on its identifier, controls its switching relay to individually control transmission of power via the target electrical cord;

wirelessly and individually route the generated control signals, including the identifier of the target electrical cord, to power monitoring circuits of the plurality of electrical cords for individually causing the power monitoring circuits to monitor power levels of the respective electrical cords; and receive, from the electronic modules of the plurality of electrical cords, data representing the monitored power levels of the respective electrical cords; and communicate, to the other device, the monitored power levels of the electrical cords.

* * * * *